| United States Patent [19] | [11] Patent Number: 4,687,303 |
| Takahashi et al. | [45] Date of Patent: Aug. 18, 1987 |

[54] ZOOM LENS SYSTEM

[75] Inventors: Sadatoshi Takahashi; Masatake Kato, both of Tokyo; Sadahiko Tsuji, Kanagawa, all of Japan

[73] Assignee: Canon Kabushiki Kaisha, Tokyo, Japan

[21] Appl. No.: 628,447

[22] Filed: Jul. 6, 1984

[30] Foreign Application Priority Data

Jul. 14, 1983 [JP] Japan .................. 58-128554

[51] Int. Cl.⁴ ............................ G02B 15/16
[52] U.S. Cl. .................... 350/427; 350/423
[58] Field of Search .................. 350/427, 423

[56] References Cited

U.S. PATENT DOCUMENTS

| 4,240,700 | 12/1980 | Ogawa et al. | 350/423 |
| 4,515,446 | 5/1985 | Takahashi et al. | 350/427 |

*Primary Examiner*—John K. Corbin
*Assistant Examiner*—P. M. Dzierzynski
*Attorney, Agent, or Firm*—Toren, McGeady & Associates

[57] ABSTRACT

A zoom lens system having, from front to rear, a positive first component, a negative second component, a positive third component and a fourth component, in which to effect zooming, the first, second and third components are moved axially in A relation such that the movements of the first and second components are non-linear with respect to that of the third component, and that when in the telephoto end, the first and third components lie more toward the front and the second component lies more toward the rear than when in the wide angle end. By specifying the relation in which the first, second and third components move as zooming nears the wide angle end, a valuable decrease in the diameter of the front lens members is achieved to provide a compact zoom lens system.

4 Claims, 16 Drawing Figures

F I G. 1(b)
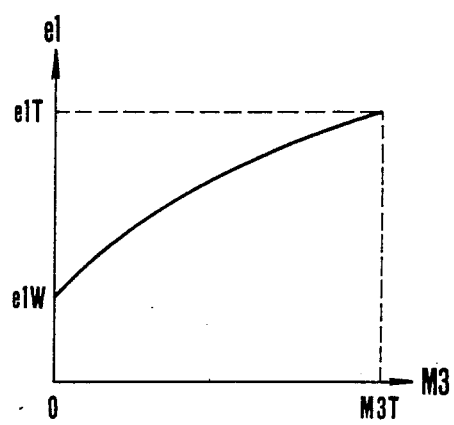
F I G. 1(c)
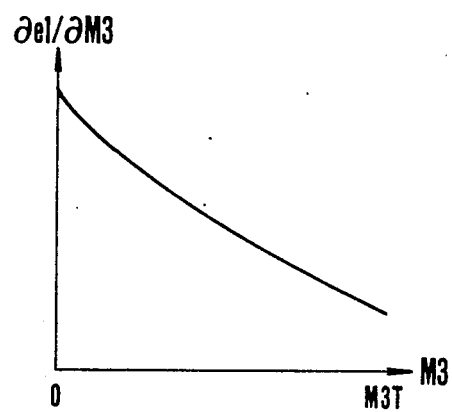

ZOOM LENS SYSTEM

BACKGROUND OF THE INVENTION

1. Field of the Invention

This invention relates to zoom lens systems, and; more particularly; to compact zoom lens systems suited to still cameras, cine cameras and video cameras.

2. Description of the Prior Art

It has already been known in the art to provide a zoom lens system comprising four lens components of which the front three are moved axially to effect zooming in Japanese Laid-Open patent application No. SHO 54-30855. These components are a first component, counting from the front, of positive power, a second component of negative power, a third component of positive power, and a fourth component of positive or negative power. As zooming is performed from the wide angle end to the telephoto end, the first and third components move forward, while the second component moves rearward.

In general, zoom lens designer works out a diameter of the first lens component by taking into account, in most cases, a rough list of the following factors:

(a) The axial beam diameter for the telephoto end at full open aperture.
(b) The ability to admit as large an oblique beam as the axial beam for the wide angle end when the object is at a minimum distance.
(c) The ability to admit as large an oblique beam as the axial beam for the telephoto end when the object is at the minimum distance.
(d) The ability to admit as large an oblique beam as the axial beam for the intermediate position when the object is at the minimum distance.

Of these, factor (a) takes on a certain value when the zoom lens is specified, and, therefore, unavoidably affects it. But this usually gives rise to no serious problem. Since factors (b) and (c) depend on the paraxial power distribution at the start point, a change of the power distribution is required.

With the use of the type described in connection with the aforesaid prior art example, where the first lens component moves forward, factor (d) becomes important for determining the value of the diameter of the first lens component in most zoom lenses. As zooming goes from the wide angle end, the distance between the first and second lens components increases rapidly particularly in the vicinity thereof with decrease of the image angle. Therefore, this type of zoom lens is associated with a drawback that the diameter of the front or first component becomes larger and the minimum object distance becomes longer. To reduce the lens diameter, the method of strengthening the refractive power of each of the lens components is very often employed. But this produces an alternative problem that the optical performance deteriorates badly, and the tolerances to which the manufacturing operations are held become more severe. Another method of moving the stop with zooming may be employed in order to insure that the oblique beam for the intermediate focal length position is admitted when the object is at the minimum distance. But this has a drawback that the operating mechanism is strained.

FIG. 1(a) illustrates paraxial power distributions of a prior art example of the zoom lens system along with the loci of movement of all zoom components thereof. FIGS. 1(b) and 1(c) are graphs representing a variation of the separation e1 between the first and second components 1 and 2 with the amount of movement M3 of the third component 3 as measured from the wide angle end, and depicting a partial differential equation of first order therefor; respectively. Symbols e1W and e1T denote the separation between the first and second components when in the wide angle end and telephoto end, respectively.

The rate of variation of the separation e1 between the first and second components 1 and 2 against the amount of movement M3 of the third component 3 is steeper in the wide angle end than in the telephoto end. In other words, a partial differentiation of second order $\delta^2 e1/\delta M3^2 < 0$. In such case, the diameter of the first lens component must be increased. Otherwise, it would be difficult to insure that an oblique beam as large as the axial beam is admitted for the minimum object distance in the region from the intermediate focal length position to the wide angle end, because the separation between the first and second components 1 and 2 increases at a far higher a rate than that of decrease of the image angle as zooming goes from the wide angle end. As a result, the zoom lens system tends to increase in the bulk and size thereof.

SUMMARY OF THE INVENTION

An object of the present invention is to provide a zoom lens system comprising four lens components of which the front three are moved axially in a specified differential relation to effect zooming so that the diameter of the first component is reduced while still permitting as large an oblique beam as the axial beam to be admitted for the region from the intermediate to the shortest focal length position, with an advantage of achieving a minimization of the weight and bulk and size of the entire system.

Another object is to provide a zoom lens system capable of focusing down to a shorter minimum object distance.

Still another object is to provide a zoom lens system corrected for aberrations to a high grade imaging performance.

BRIEF DESCRIPTION OF THE DRAWINGS

FIGS. 1(b) and 1(c) are graphs illustrating the relation in which the zoom components of the system of FIG. 1(a) move.

DETAILED DESCRIPTION OF THE PREFERRED EMBODIMENTS

Figure 1A:
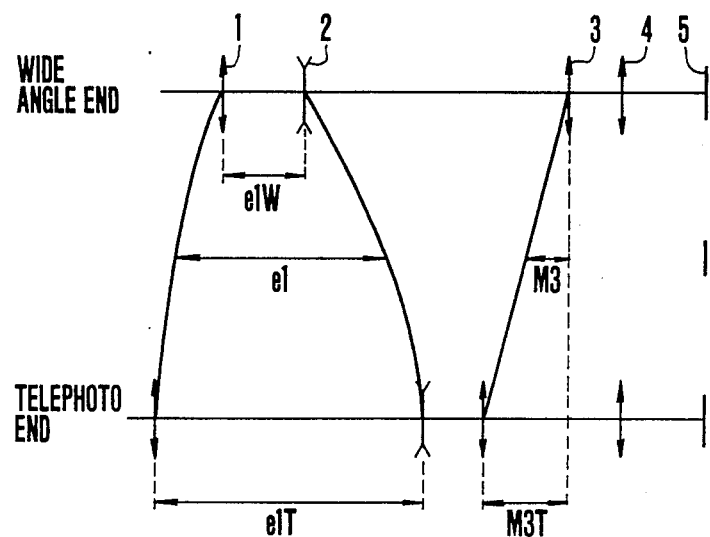
FIG. 1(a) is a schematic diagram of a prior art example of the zoom lens system.
Figure 2A:
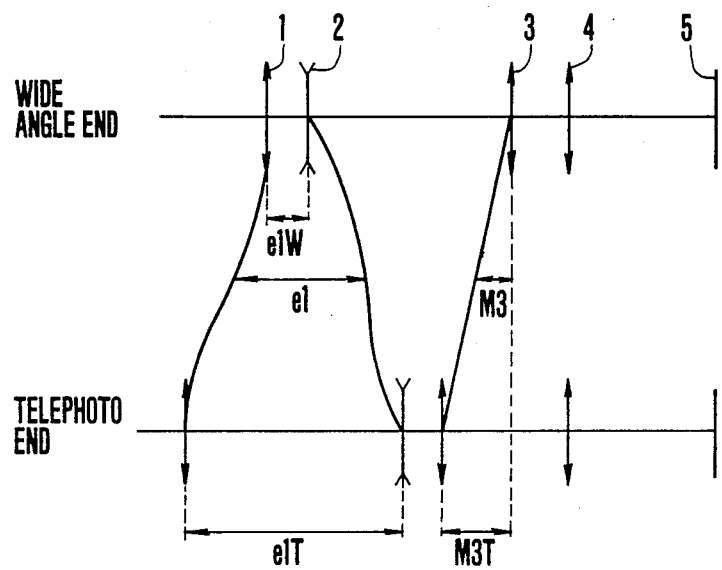
FIGS. 2(a) and 4(a) are schematic diagrams of the movements of the components of first and second embodiments of the zoom lens system according to the present invention.
Figure 2B:
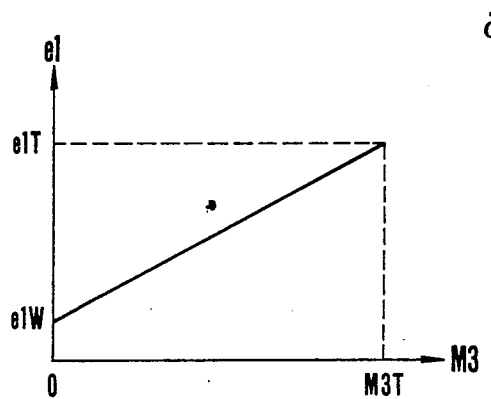
FIGS. 2(b) and 2(c) and FIG. 4(b) are graphs illustrating the relations in which the zoom components of the systems of FIGS. 2 and 4 move, respectively.
Figure 6A:
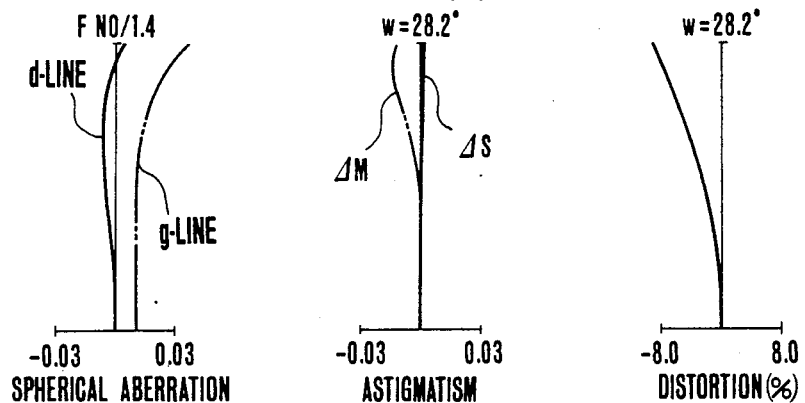
FIGS. 6(a) to 6(c) are graphic representations of the aberrations of the lens system of FIG. 3 in the wide angle end, intermediate position and telephoto end, respectively.
Figure 6B:
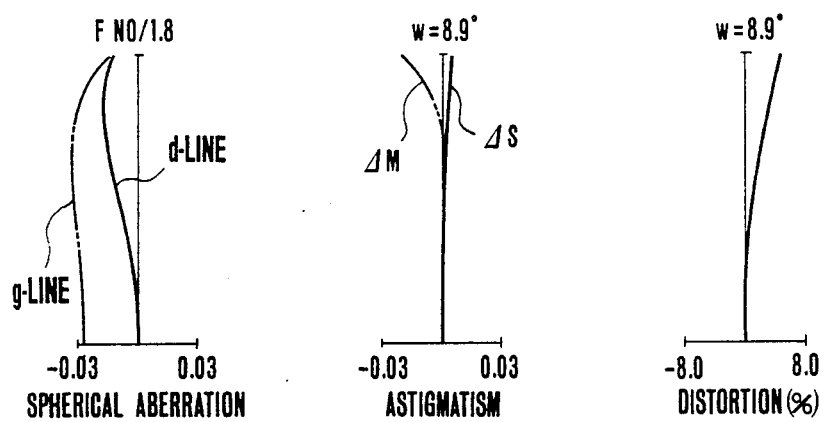
Figure 6C:
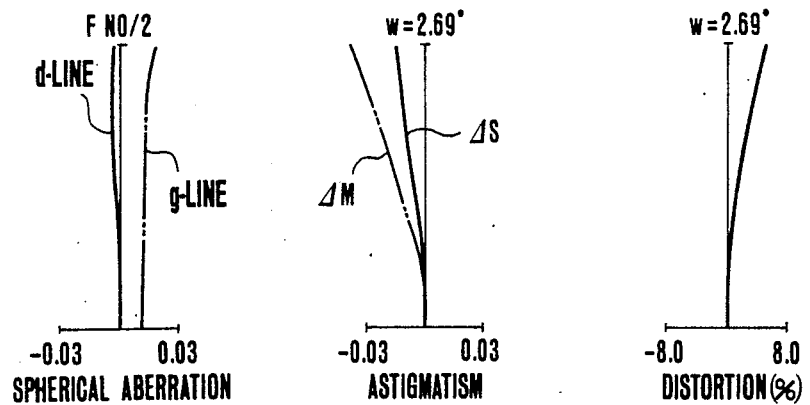

A first embodiment of the invention is shown in FIG. 2(a) for the paraxial power distribution along with the loci of movement of the zoom components, and FIG. 2(b) for the variation of the separation e1 between the first and second components 1 and 2 with the amount of movement M3 of the third component 3, from the wide angle end. An example of a specific zoom lens based on the predesign of FIG. 2 is shown in a longitudinal section view of FIG. 3 in the intermediate focal length position, and has the various aberrations as shown in FIG. 6.

As shown in FIG. 2(a), the zoom lens system of the invention comprises, from front to rear, a first component 1 of positive power, a second component 2 of negative power, a third component 3 of positive power and a fourth or image forming component 4 which remains stationary during zooming. When zooming, the first, second and third components move axially in such relation that the first and third components 1 and 3 lie more to the front in the telephoto end than in the wide angle end, and the second component 2 moves rearward as the zooming progresses. A film plane is indicated at 5.

Since the present invention employs that type of zoom lens which has four components with three movable ones for zooming, for all of these zoom components are moved in differential relations to one another, when a certain locus of movement of one of the zoom components, for example, the third component 3, is given as a start point, the number of degrees of freedom for designing the zooming loci is one. In other words, for the given variations of the amount of movement of the third component 3 and one of the separation e1 between the first and second components 1 and 2 and the separation e2 between the second and third components 2 and 3 with variation of the image magnification, a variation of the other separation is determined by the paraxial calculation. For example, with the third component 3 at a distance M3 from the side angle end thereof, when the separation e1 between the first and second components 1 and 2 is taken as variable, a value of the separation e2 between the second and third components 2 and 3 can be found under the condition that the image shift is compensated for. In short, for the given movement M3 of the third component 3, the separation e1 may be taken at a desired value. By utilizing this freedom, it is possible to alter the loci of movement of the first and second components. Another problem arising from the use of the zooming method of moving the first lens component 1, is to assure that the oblique beam admitted in the wide angle to the intermediate focal length region is sufficiently large as compared with the axial beam. This problem also can be solved by applying the aforesaid design priciple derived from one degree of freedom. That is, without recourse to strengthening of the refractive power of each component, a sufficiently large oblique beam can be admitted when the object is at the minimum distance. As has been stated before, the difficulty of assuring an oblique beam as large as the axial beam in the region from the wide angle end to the intermediate focal length end when the object is at the minimum distance is caused by the rapid variation of the separation e1 between the first and second components 1 and 2 compared with the gradual variation of the image angle as zooming progresses. By reducing; in the wide angle region; the rate of increase of the separation between the first and second components 1 and 2 with zooming, however, it becomes easy to assure the desired oblique beam.

In actual practice, when zooming is performed from the wide angle end to the telephoto end, the separation e1 between the first and second components 1 and 2 varies from a value e1W to another value e1T as a function of the movement of the third component 3, whereby the rate of variation of the separation e1 per movment M3, or δe1/δM3, is limited to a minimum in the wide angle region.

This may be otherwise expressed by using a partial differential equation of second order for the separation e1 in terms of the movement M3 as:

$$\delta^2 e1 / \delta M3^2 \geq 0.$$

What is required to do is that at the wide angle end, the separation e1 is varied so as to satisfy the above condition.

By satisfying the above condition at the wide angle end, the rate of variation δe1/δM3 in the wide angle region can be limited to a minimum.

Figure 2C:
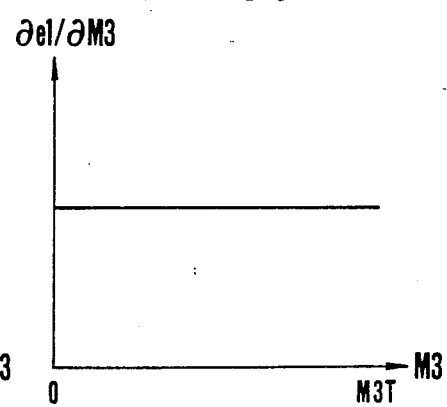
Figure 3:
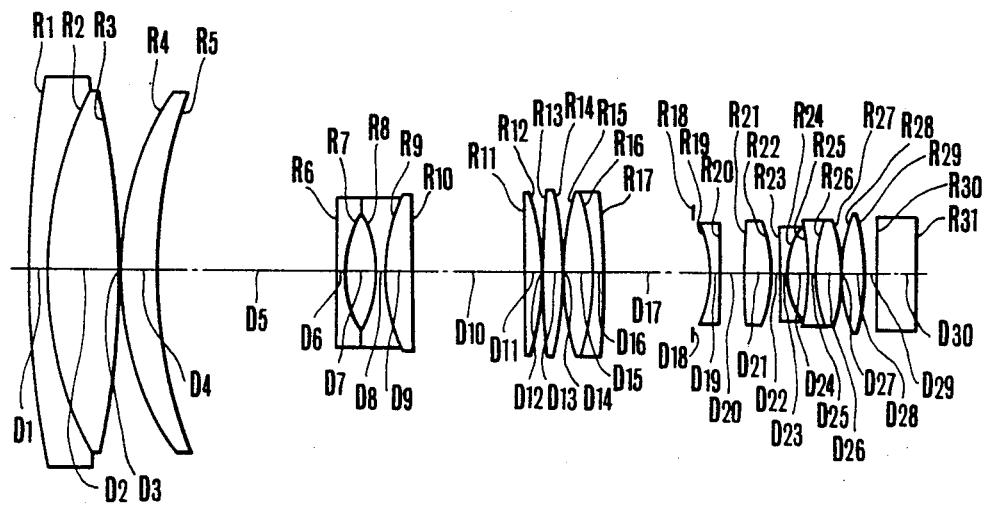
FIGS. 3 and 5 are lens block diagrams of specific examples of the first and second embodiments of the invention, respectively.

In the first embodiment of the invention, as shown in FIGS. 2(b) and 2(c), the rate of increase of the separation e1 between the first and second components 1 and 2 per the movement M3 of the third component 3, or δe1/δM3, is made uniform throughout the entire zooming range. In other words, zooming is controlled in such a way that $\delta^2 e1/\delta M3^2 = 0$. The use of such zooming method provides the possibility of assuring that the zoom lens system admits as large an oblique beam as the axial beam in the intermediate focal length positions without having to strengthen the refractive power of each component, which has heretofore been impossible to achieve.

Figure 5:
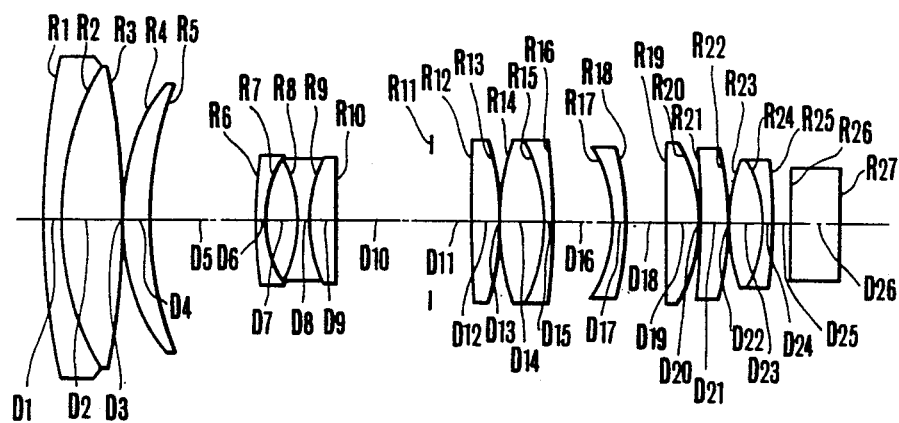
Figure 4A:
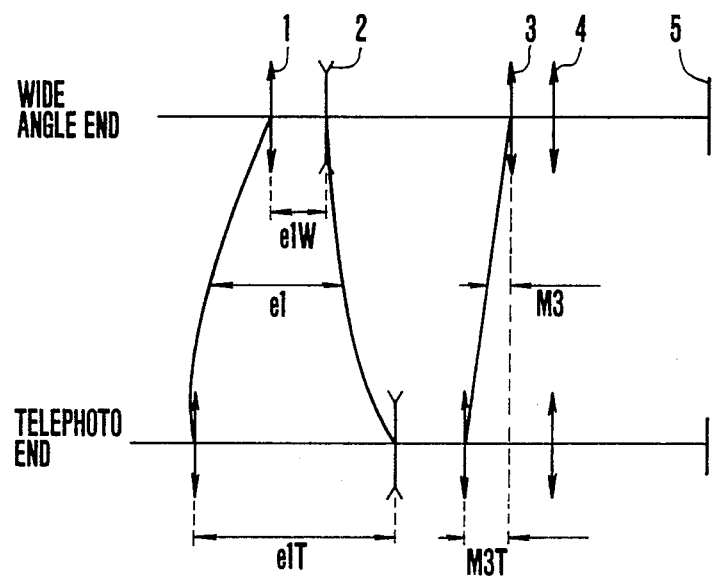
Figure 4B:
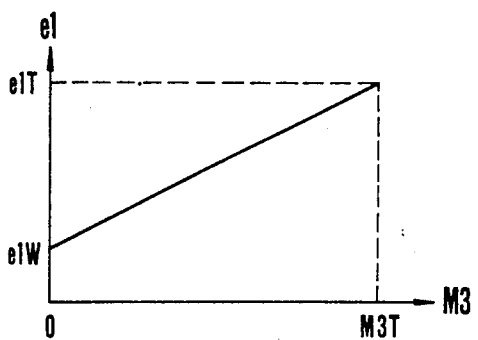
Figure 7A:
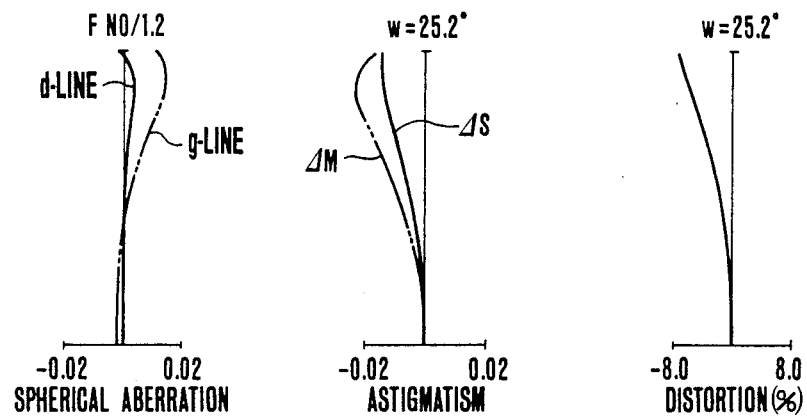
FIGS. 7(a) to 7(c) are graphic representations of the aberrations of the lens system of FIG. 5 in the wide angle end, intermediate position and telephoto end, respectively.
Figure 7B:
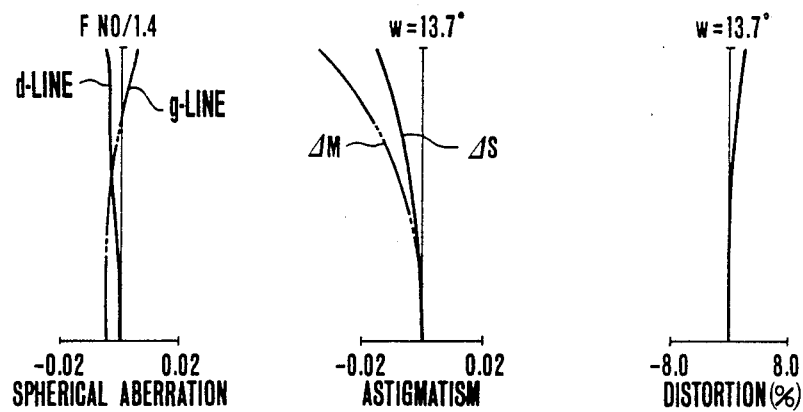
Figure 7C:
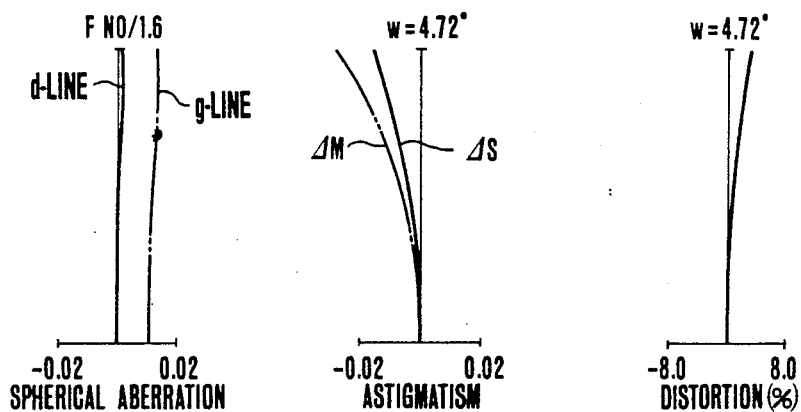

A second embodiment of the invention is shown in FIG. 4(a) for paraxial power distribution along with the loci of movement of the zoom components and FIG. 4(b) for the relationship between the variable separation e1 between the first and second components 1 and 2 and the movement M3 of the third component 3. An example of a specific zoom lens of the second embodiment is shown in a longitudinal section view of FIG. 5 for the intermediate focal length position and its various aberrations are shown in FIG. 7.

The zoom lens system of FIG. 4(a) comprises, from front to rear, a first component 1 of positive power, a second component 2 of negative power, a third component of positive power, a fourth or image forming component 4. When in the telephoto end, the first component 1 lies more toward the front, the second component 2 more toward the rear and the third component 3 more toward the front, than when in the wide angle end. The fourth component remains stationary during zooming. As zooming is performed from the wide angle end, the first component 1 moves forward, taking a frontmost position at a point near the telephoto end, and then moves slightly backward, while the second component 2 moves rearward. A fixed stop R11 is positioned at an intermediate point between the second and third components 2 and 3.

It should be noted that if the second component 2 is moved linearly relative to the movement of the third component 3, the first component 1 takes another moving locus of large curvature toward the front in the wide angle region. This results in the difficulty of assuring the admission of the sufficient large oblique beam in the region from the wide angle to the intermediate focal length position, and also in an increase of the minimum object distance. This is because the separation e1 between the first and second components 1 and 2 rapidly increases against the gradual increase of the distance M3 the third component 3 has moved, in the wide angle end.

When zooming is performed from the wide angle end to the telephoto end, the separation e1 between the first and second components 1 and 2 varies from a value e1W to another value e1T as a function of the movement M3 of the third component 3, whereby the rate of variation of the separation e1 per the movement M3 in the wide angle region is limited to a minimum. That is, what has to be satisfied at the wide angle end is $\delta^2 e1/\delta M3^2 \geq 0$.

It should also be noted that in the second embodiment, as shown in FIG. 4(b), the separation e1 between the first and second components 1 and 2 is made to vary as a linear function of the movement M3 of the third component 3, so that $\delta e1/\delta M3$ is controlled, being uniform throughout the entire zooming range. In other words, the separation e1 is varied under the condition that $\delta^2 e1/\delta M3^2 = 0$. By satisfying this condition, it is possible to shorten the minimum object distance.

Examples of specific zoom lenses of the first and second embodiments can be constructed in accordance with the numerical data given in Tables 1 and 2, respectively, for the radii of curvature, R, the axial thicknesses and air separations, D, and the refractive indices, N, for the central line or d-line of the visible spectrum, and the Abbe numbers, $\nu$, of the glasses from which the lens elements are made up, with the subscripts numbered consecutively from front to rear.

TABLE 1

F = 1.0–11.41   FNo = 1:1.4–2.0   2ω = 56.4° – 5.38°

| | | | |
|---|---|---|---|
| R1 = 17.02 | D1 = 0.28 | N1 = 1.80518 | ν1 = 25.4 |
| R2 = 5.86 | D2 = 1.09 | N2 = 1.60311 | ν2 = 60.7 |
| R3 = −13.48 | D3 = 0.01 | | |
| R4 = 4.80 | D4 = 0.62 | N3 = 1.60311 | ν3 = 60.7 |
| R5 = 9.74 | D5 = Variable | | |
| R6 = 121.15 | D6 = 0.11 | N4 = 1.77250 | ν4 = 49.6 |
| R7 = 1.85 | D7 = 0.49 | | |
| R8 = −2.10 | D8 = 0.10 | N5 = 1.69680 | ν5 = 55.5 |
| R9 = 2.60 | D9 = 0.43 | N6 = 1.84666 | ν6 = 23.9 |
| R10 = −27.62 | D10 = Variable | | |
| R11 = 60.69 | D11 = 0.24 | N7 = 1.69895 | ν7 = 30.1 |
| R12 = −6.12 | D12 = 0.01 | | |
| R13 = 11.65 | D13 = 0.32 | N8 = 1.77250 | ν8 = 49.6 |
| R14 = −7.82 | D14 = 0.01 | | |
| R15 = 4.21 | D15 = 0.49 | N9 = 1.65160 | ν9 = 58.6 |
| R16 = −3.46 | D16 = 0.15 | N10 = 1.84666 | ν10 = 23.9 |
| R17 = −12.58 | D17 = Variable | | |
| R18 = 0.0 (stop) | D18 = 0.24 | | |
| R19 = −2.07 | D19 = 0.13 | N11 = 1.80610 | ν11 = 40.9 |
| R20 = 17.70 | D20 = 0.39 | | |
| R21 = 6.49 | D21 = 0.43 | N12 = 1.60311 | ν12 = 60.7 |
| R22 = −2.29 | D22 = 0.15 | | |
| R23 = −43.98 | D23 = 0.12 | N13 = 1.80518 | ν13 = 25.4 |
| R24 = 1.52 | D24 = 0.29 | | |
| R25 = −3.93 | D25 = 0.10 | N14 = 1.53256 | ν14 = 45.9 |
| R26 = 1.94 | D26 = 0.39 | N15 = 1.63930 | ν15 = 44.9 |
| R27 = −2.57 | D27 = 0.01 | | |
| R28 = 2.82 | D28 = 0.34 | N16 = 1.60311 | ν16 = 60.7 |
| R29 = −2.98 | D29 = 0.20 | | |
| R30 = 0.0 | D30 = 0.59 | N17 = 1.51633 | ν17 = 64.1 |
| R31 = 0.0 | | | |

| F | 1.000 | 3.446 | 11.41 |
|---|---|---|---|
| D5 | 0.111 | 2.639 | 4.469 |
| D10 | 4.199 | 1.707 | 0.087 |
| D17 | 0.365 | 1.351 | 2.065 |

TABLE 2

F = 1.0–5.7   FNo = 1:1.2–1.6   2ω = 50.5° – 9.44°

| | | | |
|---|---|---|---|
| R1 = 8.80 | D1 = 0.24 | N1 = 1.80518 | ν1 = 25.4 |
| R2 = 3.75 | D2 = 0.77 | N2 = 1.60311 | ν2 = 60.7 |
| R3 = −10.73 | D3 = 0.02 | | |
| R4 = 2.89 | D4 = 0.35 | N3 = 1.60311 | ν3 = 60.7 |
| R5 = 5.13 | D5 = Variable | | |
| R6 = 4.76 | D6 = 0.12 | N4 = 1.77250 | ν4 = 49.6 |
| R7 = 1.37 | D7 = 0.43 | | |
| R8 = −1.70 | D8 = 0.12 | N5 = 1.77250 | ν5 = 49.6 |
| R9 = 1.68 | D9 = 0.38 | N6 = 1.84666 | ν6 = 23.9 |
| R10 = 80.91 | D10 = Variable | | |
| R11 = 0.0 (stop) | D11 = Variable | | |
| R12 = 21.30 | D12 = 0.38 | N7 = 1.77250 | ν7 = 49.6 |
| R13 = −3.91 | D13 = 0.02 | | |
| R14 = 4.08 | D14 = 0.54 | N8 = 1.74400 | ν8 = 44.7 |
| R15 = −2.26 | D15 = 0.12 | N9 = 1.84666 | ν9 = 23.9 |
| R16 = −7.56 | D16 = Variable | | |
| R17 = −1.75 | D17 = 0.12 | N10 = 1.77250 | ν10 = 49.6 |
| R18 = −5.72 | D18 = 0.56 | | |
| R19 = 0.0 | D19 = 0.41 | N11 = 1.72000 | ν11 = 50.2 |
| R20 = −2.28 | D20 = 0.01 | | |
| R21 = 14.28 | D21 = 0.38 | N12 = 1.72000 | ν12 = 50.2 |
| R22 = −3.68 | D22 = 0.01 | | |
| R23 = 3.29 | D23 = 0.41 | N13 = 1.51633 | ν13 = 64.1 |
| R24 = −1.69 | D24 = 0.12 | N14 = 1.84666 | ν14 = 23.9 |
| R25 = −13.75 | D25 = 0.24 | | |
| R26 = 0.0 | D26 = 0.65 | N15 = 1.51633 | ν15 = 64.1 |
| R27 = 0.0 | | | |

| F | 1.00 | 1.94 | 5.70 |
|---|---|---|---|
| D5 | 0.1413 | 1.3573 | 2.5734 |
| D10 | 1.4503 | 1.1726 | 0.2960 |
| D11 | 0.9106 | 0.5219 | 0.1332 |
| D16 | 0.3740 | 0.7627 | 1.1514 |

Even in another type of zoon lens in which the stop moves axially with zooming, for the purpose of assuring the large oblique beam in the intermediate region, the present invention when used produces a remarkable advantage. In the meantime, a zoom lens in which the second component is held stationary and the first and third component are moved as a unit to effect zooming, satisfies the conditions $\delta e1/\delta M3 = 0$ and $\delta^2 e1/\delta M3^2 = 0$. It has, however, already been known that only when the first, second and third components are made to move in differential relation to one another, can a high range high performance zoom lens system be formed. According to the invention, therefore, specified conditions are given for selection of zoom-component arrangements and relation in which the zoom components move. If these conditions are satisfied, a zoom lens system of compact form with the minimum object distance shortened and good correction of aberrations can be obtained.

As has been described in greater detail above, the zoom lens system according to the present invention is characterized in that the first, second and third components are moved axially in such relation that a second order differentiation of the separation between the first and second components by the movement of the third component as measured from the wide angle end is greater than zero at the wide angle end, this assures that an oblique beam as large as the axial beam is admitted for the region from the wide angle end to the intermediate focal length position when the object is at the minimum distance. Also; without having to strengthen the refractive powers of all lens components, the diameter of the first component can be reduced. Therefore, a light weight compact zoom lens is realized. Further, the minimum object distance is shortened, the aberrations are corrected with ease to high grade imaging performance, and no unduly large strain is placed on the operating mechanism for the zoom components.

What we claim:
1. A zoom lens system comprising:
from front to rear, a positive first lens component, a negative second lens component, a positive third lens component and a fourth lens component,
said first, second and third lens components moving when zooming, said first and second lens components moving non-linearly relative to the movement of said third lens component, and said fourth lens component remaining stationary during zooming,
said first and third lens components lying more to the front when in the telephoto end than when in the wide angle end, and said second lens component lying more to the rear when in the telephoto end than when in the wide angle end, and
the following condition being satisfied throughout the entire zooming range

$$\delta^2 e1/\delta M3^2 = 0$$

where e1 is the separation between said first and second lens components, and M3 is the distance said third component moves from the wide angle end as zooming progresses, with the rear-to-front movement being taken as positive.

2. A zoom lens system according to claim 1, wherein as zooming is performed from the wide angle end to the telephoto end, said second lens component moves reaward.

3. A zoom lens system according to claim 1, wherein said fourth lens component is of positive power.

4. A zoom lens system according to claim 1, wherein said fourth lens component is of negative power.

* * * * *